J. C. KINGSBURY.
PACKING.
APPLICATION FILED NOV. 2, 1908.

967,392. Patented Aug. 16, 1910.

Witnesses:
C. F. Meeson
C. I. Hartnett

Inventor:
J. C. Kingsbury
By Attorneys
Southgate & Southgate

UNITED STATES PATENT OFFICE.

JOHN C. KINGSBURY, OF DUDLEY, MASSACHUSETTS.

PACKING.

967,392. Specification of Letters Patent. Patented Aug. 16, 1910.

Application filed November 2, 1908. Serial No. 460,589.

*To all whom it may concern:*

Be it known that I, JOHN C. KINGSBURY, a citizen of the United States, residing at Dudley, in the county of Worcester and State of Massachusetts, have invented a new and useful Packing, of which the following is a specification.

This invention relates to a packing suitable for use for steam or hot-water, and in all places where packings are ordinarily employed.

The principal objects of the invention are to provide a form of packing which will hold better than the forms now in use; which will be cheaper to make and easier to apply; and which after a small amount of wear will not become useless as is the case with the packings now ordinarily employed.

Reference is to be had to the accompanying drawings, in which—

Figure 1:
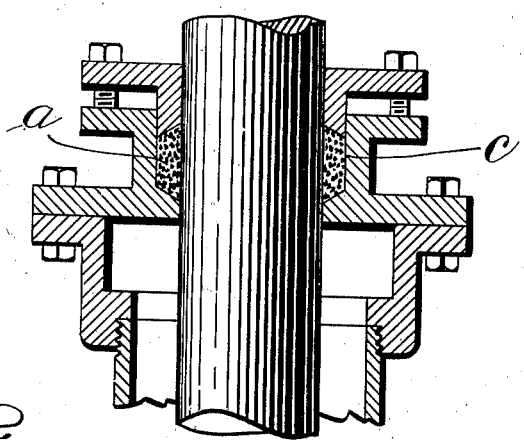
Figure 2:
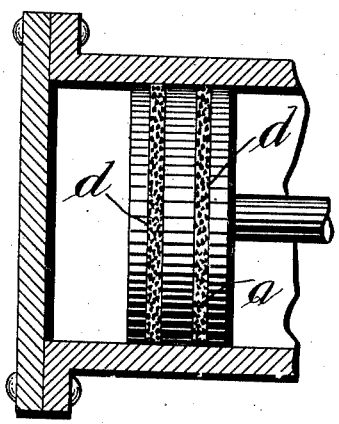
Figure 3:
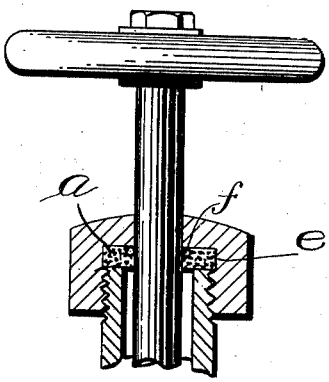
Figure 4:
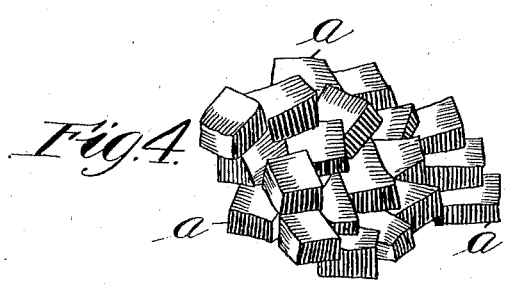
Figure 5:
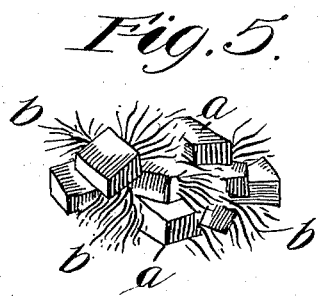

Figure 1 is a sectional view of a stuffing box; Fig. 2 is a similar view of a piston or cylinder; and Fig. 3 is a similar view of a portion of a valve, showing certain ways in which the invention may be applied; Fig. 4 is a view showing a form of packing suitable for application in the devices shown in the first three figures; and Fig. 5 is a similar view showing an additional feature.

It has been customary to make packings in a predetermined form so that each packing is necessarily made for the particular place in which it is to be applied, and consequently a packing made for one place will ordinarily not fit in another. Another disadvantage of these packings of a definite shape consists in the fact that they are difficult and expensive to put in position, and it is of course well understood that when only slightly worn they have to be removed and replaced, almost all of the old packing thus being rendered useless.

In order to provide a packing which will fit in any place, which when worn can simply be added to without removing any of the packing in position, and which can be put in place easily and compressed in a convenient way to the desired extent so as to secure the necessary pressure for a steam-tight joint, I have provided a packing formed as follows:—Reference first is to be had to Fig. 4 in which a packing material is shown as cut up into small blocks, preferably of angular or polygonal form, but which may conveniently be made of irregular shapes. They may be made in the form of square, triangular, or any other desired cross section, as the shape of the pieces is not important. In order to make them, the packing material, as for example, rubber, frictioned-duck, combinations of elastic material with canvas and other textile materials, and even gutta-percha, leather, or any other material which can be used for the particular purpose, are put through a machine or cut up by hand into small pieces *a*, preferably from one-quarter to one-half of an inch wide, long, and thick. These pieces may, if desired, be mixed with small particles of asbestos *b* as shown in Fig. 5, or they may be used by themselves as shown in Fig. 4.

In order to apply the packing, the cavity into which it is put, as for example, at *c* in Fig. 1, *d* in Fig. 2, or *e* in Fig. 3, is exposed in any ordinary way, and the packing applied by hand and crowded down into the cavity, after which a cap, gland, or the like, is applied and the packing compressed by forcing the same into position, or in case of a piston the packing is preferably pressed into the grooves by hand, and when it is fully compressed, the piston is moved back into the cylinder.

I have found in practice that by the use of a packing of this form, a much tighter joint can be obtained than with the ordinary forms of packing, and that it will hold longer, and when it does get worn, more pressure can be applied, in the form shown in Figs. 1 and 3 for example, so as to make the packing tighten up again; also that when it is necessary to renew the packing, this can be done simply by adding a portion of new material without removing the old, as that the entire packing is consumed eventually and none of it has to be taken away and discarded. In this way great economy is introduced, and moreover small particles or scraps of packing can be used without losing any valuable properties of the packing.

The particles of packing preferably are covered or coated with graphite before being put in position. Also in cases where the parts of the device to be packed are so worn that it is hard to retain an ordinary packing in proper position, these pieces can be used alone but they can be kept in better by placing some pieces of Babbitt or other bearing metal around the worn part to sustain the packing. These metal pieces or shot preferably are made spherical, or at least they have smooth edges, as shown at *f* in Fig. 3.

While I have illustrated and described certain preferred forms of the invention, and ways of applying the same I am aware that many modifications may be made therein by any person skilled in the art without departing from the scope of the invention as expressed in the claims. Therefore I do not wish to be limited to all the details of construction shown, or to the particular applications illustrated, but What I do claim is:—

1. A packing consisting of a plurality of individual, independent, and freely separable blocks of packing material of irregular shape filling the entire space to be packed and in direct contact with the walls thereof.

2. A packing comprising a plurality of homogeneous, freely separable, independent, and unconnected blocks of soft rubber of such shape and size as to be capable of being handled individually.

3. A packing consisting of a plurality of independent and unconnected blocks of resilient packing material held in position under pressure, mixed with smaller fragments of asbestos, and free from binding materials.

4. A packing consisting of a plurality of independent and unconnected blocks of resilient packing material mixed with asbestos free from binding materials and held in position under pressure.

5. A packing consisting of a plurality of independent and unconnected blocks of resilient packing material mixed with asbestos coated with graphite.

In testimony whereof I have hereunto set my hand, in the presence of two subscribing witnesses.

JOHN C. KINGSBURY.

Witnesses:
ALBERT E. FAY,
C. FORREST WESSON.